US012608466B1

(12) United States Patent
Sahu et al.

(10) Patent No.: US 12,608,466 B1
(45) Date of Patent: Apr. 21, 2026

(54) CONTROLLING DEPLOYMENT OF SERVERLESS FUNCTION CODES IN CUSTOMER ACCOUNTS ON SERVERLESS PLATFORMS

(71) Applicant: Trend Micro Incorporated, Tokyo (JP)

(72) Inventors: Suraj Prakash Sahu, Ottawa (CA);
Pawan Kinger, Round Rock, TX (US);
Alfredo de Oliveira, Toronto (CA);
David Fiser, Toronto (CA)

(73) Assignee: Trend Micro Incorporated, Tokyo (JP)

( * ) Notice: Subject to any disclaimer, the term of this patent is extended or adjusted under 35 U.S.C. 154(b) by 225 days.

(21) Appl. No.: 18/465,734

(22) Filed: Sep. 12, 2023

(51) Int. Cl.
| | |
|---|---|
| *G06F 21/55* | (2013.01) |
| *G06F 21/56* | (2013.01) |
| *G06F 21/57* | (2013.01) |

(52) U.S. Cl.
CPC ............ *G06F 21/552* (2013.01); *G06F 21/56* (2013.01); *G06F 21/577* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 10,154,065 | B1 | 12/2018 | Buchler et al. | |
| 11,455,114 | B1 * | 9/2022 | Chinthekindi | ........ G06F 3/0647 |
| 11,574,058 | B1 | 2/2023 | Johnson | |
| 2019/0007458 | A1 * | 1/2019 | Shulman | ............ H04L 63/1433 |
| 2019/0312899 | A1 * | 10/2019 | Shulman | ............ H04L 63/1425 |
| 2020/0026850 | A1 * | 1/2020 | Levin | ........................ H04L 63/20 |
| 2021/0200527 | A1 * | 7/2021 | Sanchez | .................... G06F 8/65 |
| 2021/0352136 | A1 * | 11/2021 | Dojka | ..................... H04L 67/34 |
| 2022/0129540 | A1 * | 4/2022 | Sheriff | ................... G06N 20/10 |
| 2022/0222335 | A1 * | 7/2022 | Bosch | ..................... G06F 21/57 |
| 2022/0345483 | A1 * | 10/2022 | Shua | ..................... H04L 9/0825 |
| 2023/0418834 | A1 * | 12/2023 | Pandey | .............. G06F 21/6218 |
| 2024/0259396 | A1 * | 8/2024 | Kerkar | ................ H04L 63/1416 |
| 2024/0406193 | A1 * | 12/2024 | Lidgi | ................... H04L 63/1441 |

OTHER PUBLICATIONS

"Admission Controllers Reference", Kubernetes, Downloaded Aug. 9, 2023, https://kubernetes.io/docs/reference/access-authn-authz/admission-controllers/.
"AWS Lambda", Wikipedia, Downloaded Jul. 28, 2023, https://en.wikipedia.org/wiki/AWS_Lambda.

(Continued)

*Primary Examiner* — Ali H. Cheema
*Assistant Examiner* — Duilio Munguia
(74) *Attorney, Agent, or Firm* — Beyer Law Group LLP

(57) ABSTRACT

A customer account on a serverless platform is monitored for deployment of serverless function codes. When a serverless function code is detected to have been deployed in the customer account, the deployment is checked against admission control policies of the customer account. A corresponding serverless function in the customer account that results from the deployment of the serverless function code is terminated when the deployment of the serverless function code is prohibited by an admission control policy.

16 Claims, 3 Drawing Sheets

(56) References Cited

OTHER PUBLICATIONS

"Function as a Service", Wikipedia, Downloaded Jul. 28, 2023, https://en.wikipedia.org/wiki/Function_as_a_service.

"Runtime Application Self-Protection", Wikipedia, Downloaded Aug. 9, 2023, https://en.wikipedia.org/wiki/Runtime_application_self-protection.

"Serverless Computing", Wikipedia, Downloaded Jul. 17, 2023, https://en.wikipedia.org/wiki/Serverless_computing.

"Serverless Computing vs. Containers | How to Choose", Cloudflare, Downloaded Jul. 28, 2023, https://www.cloudflare.com/learning/serverless/serverless-vs-containers/.

"Use Admission Controllers to Enforce Security Policies", AWS, Downloaded Aug. 9, 2023, https://docs.aws.amazon.com/whitepapers/latest/security-practices-multi-tenant-saas-applications-eks/use-admission-controllers-to-enforce-security-policies.html.

"What is AWS Lambda?", AWS, Downloaded Jul. 28, 2023, https://docs.aws.amazon.com/lambda/latest/de/welcome.btml.

"What is CSPM?", Microsoft, Downloaded Aug. 9, 2023, https://www.microsoft.com/en-us/security/business/security-101/what-is-cspm.

"What is Serverless Computing? | Serverless Definition", Cloudflare, Downloaded Jul. 28, 2023,. https://www.cloudflare.com/learning/serverless/.

* cited by examiner

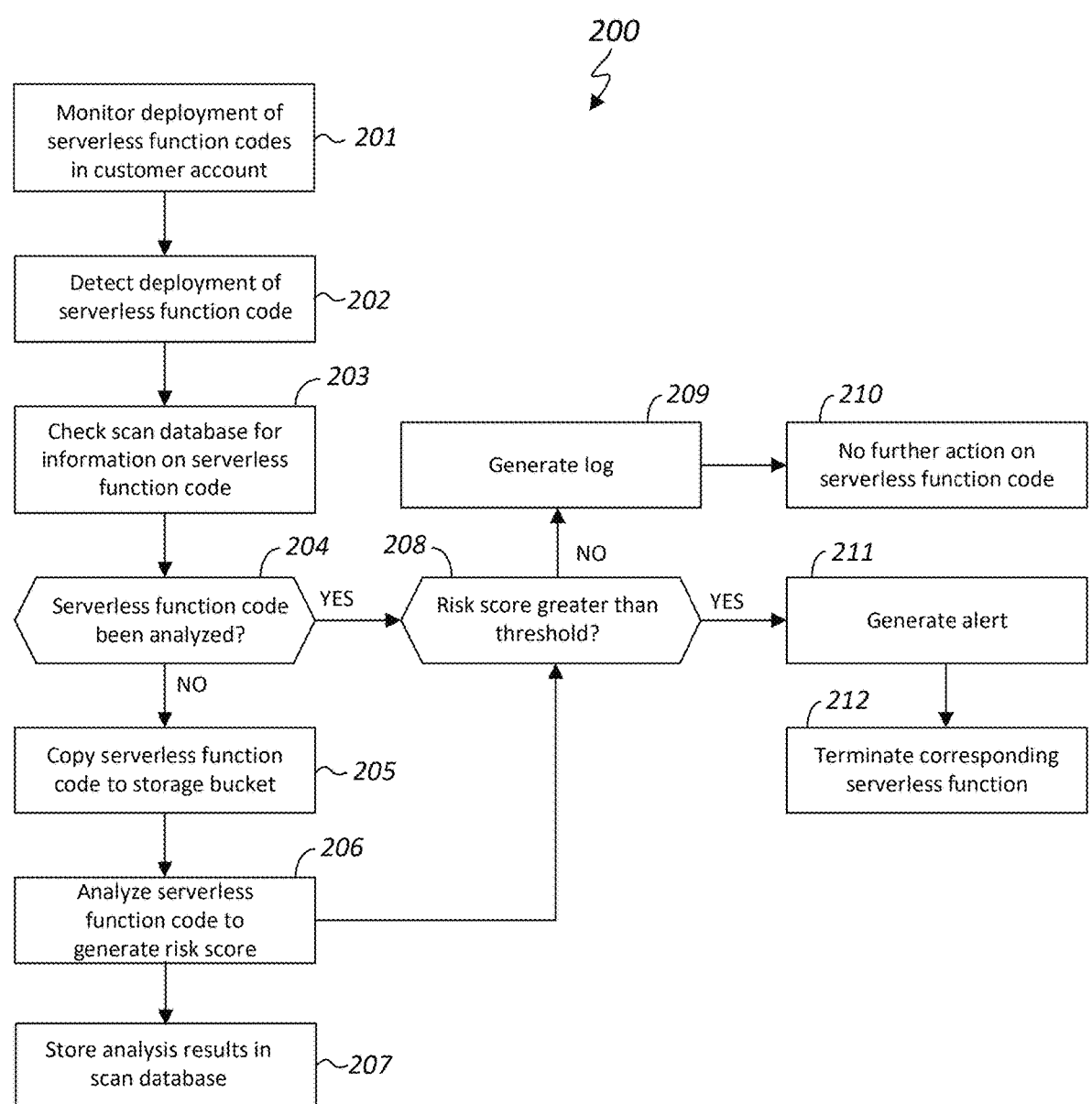

*200*

Monitor deployment of serverless function codes in customer account — *201*

Detect deployment of serverless function code — *202*

Check scan database for information on serverless function code — *203*

Serverless function code been analyzed? — *204*

Copy serverless function code to storage bucket — *205*

Analyze serverless function code to generate risk score — *206*

Store analysis results in scan database — *207*

Risk score greater than threshold? — *208*

Generate log — *209*

No further action on serverless function code — *210*

Generate alert — *211*

Terminate corresponding serverless function — *212*

FIG. 2

CONTROLLING DEPLOYMENT OF SERVERLESS FUNCTION CODES IN CUSTOMER ACCOUNTS ON SERVERLESS PLATFORMS

TECHNICAL FIELD

The present disclosure is directed to serverless functions.

BACKGROUND

Serverless computing is a public cloud computing execution model that allows software developers to build and run application programs without having to provide and manage the servers (hence the name "serverless"). In serverless computing, a cloud service provider provides a serverless platform on which application programs of a customer runs as serverless functions. The cloud service provider dynamically manages the allocation of computing resources of the serverless platform to run the serverless functions. Serverless computing differs from containers and virtual machines in that the customer can focus on the creation of the serverless function code, and does not have to deal with the underlying computing resources and runtime components. The Amazon Web Services™ (AWS) cloud service includes the AWS Lambda™ platform, which is a popular serverless platform.

Serverless functions are employed to implement services on the public Internet. Although serverless functions are convenient and cost-effective for some customers, studies have reported that misconfigured and vulnerable serverless function codes pose a significant risk to services hosted in the cloud. Cybersecurity measures in other execution models are not readily applicable to serverless computing because customers of the serverless platform have reduced responsibility in terms of backend resources and software management. Customers also typically do not have the ability to run cybersecurity modules that control serverless function code deployment in a customer account.

BRIEF SUMMARY

In one embodiment, a method of controlling deployment of serverless function codes includes monitoring deployment of serverless function codes in a customer account of a plurality of customer accounts on a serverless platform. Deployment of a serverless function code is detected in the customer account, the deployment of the serverless function code resulting in a corresponding serverless function running in the customer account. Responsive to detecting the deployment of the serverless function code in the customer account, a determination is made as to whether any of a plurality of admission control policies of a customer account applies to the deployment of the serverless function code in the customer account. The corresponding serverless function in the customer account is terminated responsive to determining that the deployment of the serverless function code in the customer account is prohibited by an admission control policy of the plurality of admission control policies.

In one embodiment, a method of controlling deployment of serverless function codes includes detecting deployment of a serverless function code in a customer account of a plurality of customer accounts on a serverless platform, the deployment of the serverless function code resulting in a corresponding serverless function running in the customer account, the deployment of the serverless function code being detected from outside the customer account. Responsive to detecting the deployment of the serverless function code, a determination is made as to whether the serverless function code has been subjected to cybersecurity analysis. Responsive to the serverless function code being determined as not having been subjected to cybersecurity analysis, the serverless function code is copied from a first cloud storage bucket to a second cloud storage bucket. After copying the serverless function code from the first cloud storage bucket to the second cloud storage bucket, cybersecurity analysis is performed on the serverless function code to generate a risk score. The corresponding serverless function is terminated in response to the risk score indicating that the serverless function code poses a severe risk.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 shows a flow diagram of a method of controlling deployment of serverless function codes, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
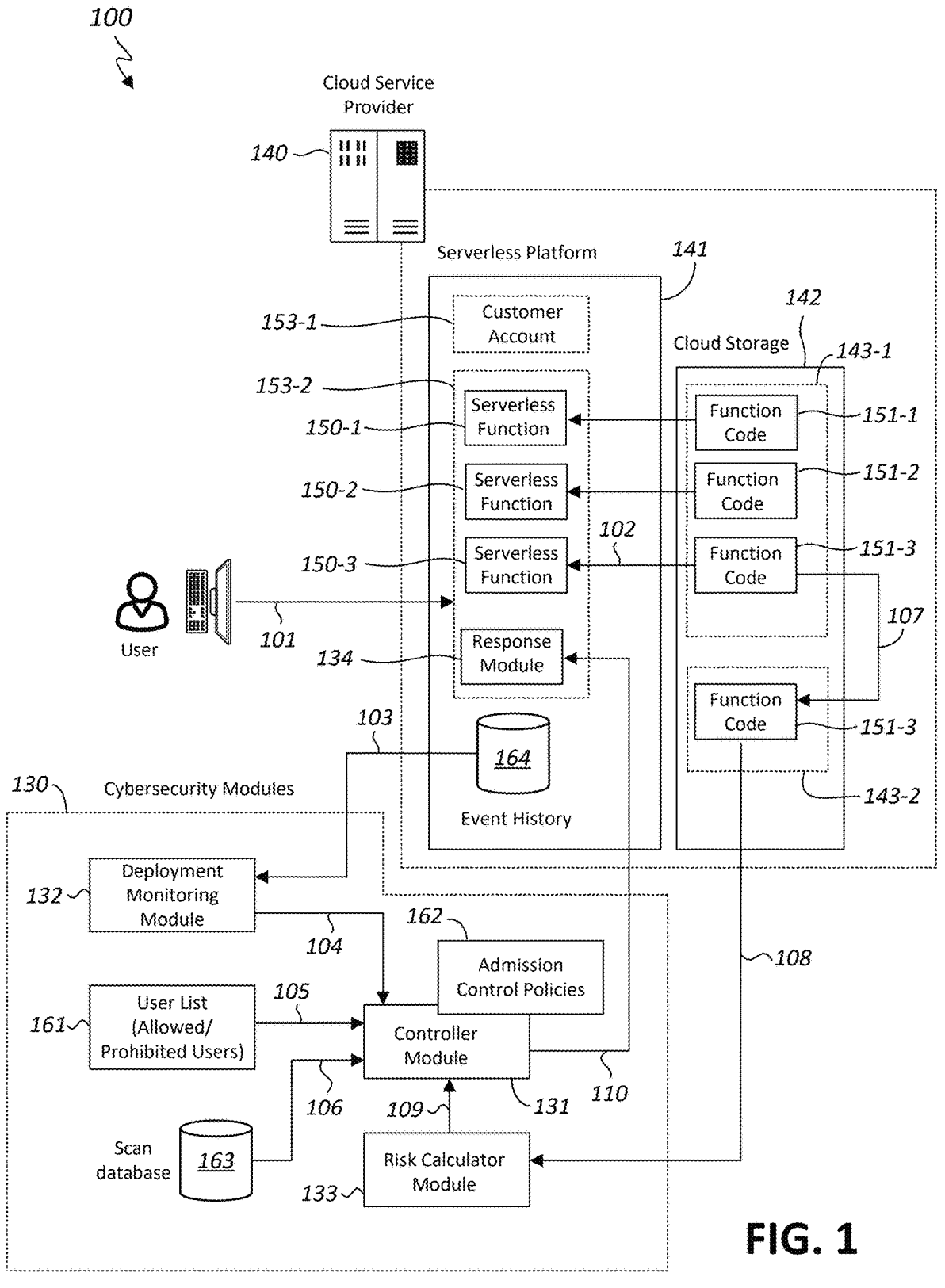
FIG. 1 shows a block diagram of a system for controlling deployment of serverless function codes, in accordance with an embodiment of the present invention.

FIG. 1 shows a block diagram of a system 100 for controlling deployment of serverless function codes, in accordance with an embodiment of the present invention. In the example of FIG. 1, the system 100 comprises a computer system that hosts a plurality of cybersecurity modules 130 and a cloud service provider 140.

The cloud service provider 140 comprises computing infrastructure for providing a serverless platform 141 and a cloud storage 142. The computing infrastructure may comprise one or more server computers, storage devices, and associated software. In one embodiment, the cloud service provider 140 is the AWS™ cloud service, the serverless platform 141 is the AWS Lambda™ platform, and the cloud storage 142 is the Amazon Simple Storage Service™ (S3) service. As can be appreciated, other cloud service providers may also be employed without detracting from the merits of the present invention. The serverless platform 141 and the cloud storage 142 may also be provided by separate cloud service providers.

The cloud storage 142 provides object-level storage buckets 143 (i.e., 143-1, 143-2, etc.), with each storage bucket 143 being storage space of a customer. In the example of FIG. 1, the storage buckets 143 store serverless function codes 151 (i.e., 151-1, 151-2, 151-3 etc.) of serverless functions 150 (i.e., 150-1, 150-2, 150-3, etc.). A serverless function 150 is a running instance of a corresponding serverless function code 151. A serverless function code 151 may be a source code or a container image of a serverless function 150. In the example of FIG. 1, a serverless function 150-1 is a running instance of a serverless function code 151-1, a serverless function 150-2 is a running instance of a serverless function code 151-2, and a serverless function 150-3 is a running instance of a serverless function code 151-3.

The serverless platform 141 has a plurality of customer accounts 153 (i.e., 153-1, 153-2, etc.). Deploying a serverless function code 151 in a customer account 153 results in a corresponding serverless function 150 running in the customer account 153. A serverless function code 151 may be deployed manually by a user of the customer account 153 or automatically by a predetermined event. In the example of FIG. 1, the serverless function codes 151-1, 151-2, and 151-3 are stored in the storage bucket 143-1. A user of the customer account 153-2 that has access privileges to the storage bucket 143-1 may deploy the function codes 151-1, 151-2, and 151-3 to run in the customer account 153-2 as serverless functions 150-1, 150-2, and 150-3, respectively.

The cybersecurity modules 130 may comprise software for controlling deployment of serverless function codes. The operations of the cybersecurity modules 130 may be offered as a service by a cybersecurity vendor to control deployment of serverless function codes 151 in a subscribed customer account 153. The cybersecurity modules 130 may be implemented to run on dedicated server computers, on computing infrastructure of a cloud service provider, or other computer system. For example, the cybersecurity modules 130 may be hosted by a computer system that is separate from the cloud service provider 140, but with one or more modules running as a serverless function in a dedicated (for cybersecurity purposes) customer account or subscribed customer account on the serverless platform 141.

In the example of FIG. 1, the cybersecurity modules 130 comprise a controller module 131, a deployment monitoring module 132, a risk calculator module 133, and a response module 134. In one embodiment, a response module 134 is a serverless function that runs in a subscribed customer account 153.

The deployment monitoring module 132 is configured to monitor a subscribed customer account 153 for deployment of serverless function codes 151. Monitoring for serverless function code deployment may be performed a number of ways, which depend on the particulars of the cloud service provider 140. For example, the AWS CloudTrail™ service or Azure Monitor™ service may be used to obtain detailed information about serverless function code deployment on the AWS Lambda™ platform. In one embodiment, the deployment monitoring module 132 extracts deployment information of a serverless function code 151 from a log of event history 164 of a customer account 153. The log of event history 164 may comprise records of activities in the customer account 153. Examples of deployment information that may be obtained by the deployment monitoring module 132 from the log of event history 164 include: (a) user identity, accessKeyID, Username; (b) Cloud Account ID; (c) EventName; (d) FunctionName; (c) Function hash or Image Name; and (f) Region.

In one embodiment, the log of event history 164 is from the AWS CloudTrail™ service, which provides a record of application programming interface (API) calls made in the customer account 153, including API calls made via the AWS™ Management Console, AWS™ software development kits (SDKs), command line tools, and other AWS™ services. By parsing the AWS™ CloudTrail log of a customer account 153, the deployment monitoring module 132 identifies which services are being used, by whom, and when in the customer account 153. In this embodiment where the serverless platform 141 is the AWS Lambda™ platform, the deployment monitoring module 132 may detect new or updated deployment of serverless function codes 151 by monitoring for and parsing calls involving the "CreateFunction", "UpdateFunctionCode", and "UpdateFunctionConfiguration" APIs. These just-mentioned APIs offer insights into the details of deployment of serverless function codes 151 on the AWS Lambda™ platform, including information on the user who initiated the deployment, when the deployment occurred, and which resources were involved. In the present disclosure, deployment of a serverless function code includes new deployment or updated deployment.

The deployment monitoring module 132 provides deployment information to the controller module 131. In one embodiment, the controller module 131 is implemented as a serverless function. In that embodiment, the deployment monitoring module 132 triggers the controller module 131 to execute in a dedicated customer account 153 on the serverless platform 141 responsive to deployment of a serverless function code 151 in a subscribed customer account 153.

The controller module 131 is configured to control deployment of a serverless function code 151 in a subscribed customer account 153. In one embodiment, the controller module 131 initiates termination of a corresponding serverless function 150 when the deployed serverless function code 151 has a risk score indicative of a severe security risk or when an admission control policy 162 of the customer account prohibits the deployment of the serverless function code 151. In some embodiments, the deployment is recorded in a log in addition to or instead of terminating the corresponding serverless function 150.

The controller module 131 receives from the deployment monitoring module 132 the deployment information of a deployed serverless function code 151. The controller module 131 compares the deployment information against the admission control policies 162.

The admission control policies 162 indicate rules and response actions that apply to deployment of serverless function codes 151 in a particular subscribed customer account 153. In one embodiment, each subscribed customer account 153 has its own, separate admission control policies 162. Examples of admission control policies 162 include: (a) if a serverless function code 151 is deployed without being subjected to cybersecurity analysis, perform action logging and/or termination of the corresponding serverless function 150; (b) If a serverless function code 151 containing malware is deployed, perform action logging and/or termination of the corresponding serverless function 150; (c) if a serverless function code 151 has multiple critical severity vulnerabilities, perform action logging and/or termination of the corresponding serverless function 150; (d) if a user that deployed a serverless function code 151 is not on the allowed list, perform action logging and/or termination of the corresponding serverless function 150; and (e) if a user that deployed a serverless function code 151 is prohibited or compromised, perform action logging and/or termination of the corresponding serverless function 150.

The risk calculator module 133 is configured to calculate a risk score for a serverless function code 151, with the risk score being indicative of the security risk posed by the serverless function code 151. The higher the risk score, the greater (or more severe) the security risk posed by the serverless function code 151. The risk score may be based on results of cybersecurity analysis performed on the serverless function code 151. In one embodiment, a default admission control policy 162 of all customer accounts 153 is to terminate a serverless function 150 if a risk score of the corresponding serverless function code 151 exceeds a risk threshold.

In one embodiment, the risk calculator module 133 generates a risk score by performing one or more of the following cybersecurity analysis on a serverless function code 151: (a) vulnerability scan of the serverless function code 151; (b) malware scan of the serverless function code 151; (c) infrastructure as code scan of the serverless function code 151 for configuration; (d) static code analysis of the serverless function code 151; (e) detection of security issues using artificial intelligence, machine learning, and sandboxing; and (f) evaluation of runtime configuration using a Cloud Security Posture management tool. The risk calculator module 133 may perform cybersecurity analysis of a serverless function code 151 using suitable conventional algorithms or inspection services, such as the AWS Inspector™ service, Trend Micro Cloud Sentry™ service, Trend Micro Container Security™ service, or other third-party tools or services. Results of the cybersecurity analysis may be normalized and weighted to generate the risk score. In one embodiment, when a deployed serverless function code 151 has not undergone cybersecurity analysis, the controller module 131 causes the serverless function code 151 to be copied to a separate storage bucket 143 for cybersecurity analysis and risk score generation as described above.

Results of cybersecurity analysis performed on a serverless function code 151, including the risk score of the serverless function code 151, are stored in a scan database 163 with references to an identifier of the serverless function code 151 and the origin or location of the serverless function code 151. A serverless function code 151 may be identified by its code hash or image name. The scan database 163 may be stored in a dedicated storage bucket 143 of the cloud storage 142 or other storage device or service. The controller module 131 may consult the scan database 163 to determine if a serverless function code 151 has undergone cybersecurity analysis and, if so, obtain the risk score of the serverless function code 151.

A customer account 153 may be shared by a plurality of users. A user list 161 is a listing of allowed users and prohibited users of a particular customer account 153. Allowed users are users that are allowed to deploy serverless function codes 151 in the customer account 153, whereas prohibited users are high-risk users that are not allowed to deploy serverless function codes 151. Users may be allowed to deploy or be prohibited from deploying specific serverless function codes 151. The allowed users may be specified by the customer. The listing of prohibited users may be based on user behavior monitoring, such as by using the Trend Micro Extended Detection and Response (XDR)™ service, AWS GuardDuty™ service, or various third-party services or tools. The controller module 131 may consult the user list 161 to determine if a user that deployed a serverless function code 151 is allowed or prohibited.

The controller module 131 does not have to perform further operations regarding deployment of a serverless function code 151 when the admission control policies 162 do not apply to the deployment. However, in cases where an admission control policy 162 applies to the deployment, the controller module 131 performs further operations in accordance with the applicable admission control policy 162. More particularly, an admission control policy 162 may indicate performing a response action, such as logging the deployment and/or terminating the corresponding serverless function 150, that is responsive to the deployment of the serverless function code 151. The controller module 131 sends an instruction to the response module 134 to perform the response action as per the applicable admission control policy 162.

The response module 134 receives from the controller module 131 the instruction to perform a response action. If the response action is to generate an alert, the response module 134 may generate an alert by displaying a warning message on a console, dashboard, or other user interface displayed on a display screen of a computer for managing the subscribed customer account 153. The alert may also be generated by sending a message to an administrator, sending a message to a ticketing system, recording an entry in a log, etc.

If the response action is to terminate a serverless function 150, the controller module 131 sends the response module 134 information for terminating the serverless function 150. For example, the controller module 131 may send the response module 134 values of parameters needed to invoke a serverless function delete API of the serverless platform 141. The details of terminating a serverless function 150 vary depending on the particulars of the serverless platform 141.

In the embodiment where the serverless platform 141 is the AWS™ Lambda platform, the response module 134 may be implemented as an AWS™ Lambda delete serverless function that is accessed through an API gateway. The following minimum parameters are needed to terminate a serverless function 150 of the AWS™ Lambda platform: (1) AWS™ region and (b) Function name. Upon receiving a request from the controller module 131 to terminate a serverless function 150, the response module 134 initiates the termination by invoking the DeleteFunction API call to delete the serverless function 150 from running in the customer account 153.

In an example operation, the customer account 153-2 is subscribed to the serverless function code deployment control service provided by the cybersecurity modules 130. A user of the customer account 153-2 (see arrow 101) deploys the serverless function code 151-3 in the customer account 153-2, resulting in the serverless function 150-3 running in the customer account 153-2 (see arrow 102). The deployment monitoring module 132 detects the deployment from one or more records of the deployment in the log of event history 164 of the customer account 153-2 (scc arrow 103). Responsive to detecting deployment of the function code 151-3 in the customer account 153-2, the deployment monitoring module 132 provides the controller module 131 (see arrow 104) information regarding the deployment.

The controller module 131 consults the user list 161 of the customer account 153-2 to determine if the user that deployed the serverless function code 151-3 is an allowed or prohibited user of the customer account 153-2 (see arrow 105). The controller module 131 also consults the scan database 163 (see arrow 106) to retrieve a risk score of the serverless function code 151-3 and to obtain results of cybersecurity analysis performed on the serverless function code 151-3, such as whether the serverless function code 151-3 has certain vulnerabilities, contains malware, etc. If the serverless function code 151-3 has been previously subjected to cybersecurity analysis, the serverless function code 151-3 will have a corresponding risk score in the scan database 163.

The controller module 131 determines whether to allow or terminate the serverless function 150-3 based on applicable admission control policies 162 of the customer account 153-2. For example, an admission control policy 162 may indicate generating an alert and/or terminating the serverless function 150-3 when the serverless function code 151-3 has a risk score that exceeds a predetermined risk threshold; generating an alert and/or terminating the serverless function 150-3 when the serverless function code 151-3 has not been subjected to cybersecurity analysis; generating an alert and/or terminating the serverless function 150-3 when the serverless function code 151-3 has critical vulnerabilities; generating an alert and/or terminating the serverless function 150-3 when the serverless function code 151-3 contains malware; generating an alert and/or terminating the serverless function 150-3 when the user that deployed the serverless function code 151-3 is not an allowed user or is a prohibited user; etc.

In the example operation, an admission control policy 162 of the customer account 153-2 indicates performing cybersecurity analysis on the serverless function code 151-3 when the serverless function code 151-3 has not been subjected to cybersecurity analysis (e.g., when the serverless function code 151-3 has no risk score in the scan database 163). In that case, when the serverless function code 151-3 has not been subjected to cybersecurity analysis, the controller module 131 causes the serverless function code 151-3 to be copied from the storage bucket 143-1 to a storage bucket 143-2 that is dedicated for cybersecurity analysis (see arrow 107). Copying the serverless function code 151-3 to the storage bucket 143-2 allows the risk calculator module 133 to perform cybersecurity analysis on the serverless function code 151-3 (see arrow 108). The risk calculator module 133 provides a risk score and other results of the cybersecurity analysis of the serverless function code 151-3 to the controller module 131 (see arrow 109).

In the example operation, the controller module 131 initiates termination of the serverless function 150-3 as per an admission control policy 162 that applies to the deployment of the serverless function code 151-3. More particularly, in the example operation, the serverless function code 151-3 has a risk score that exceeds a predetermined risk threshold set in the applicable admission control policy 162. Accordingly, the controller module 131 initiates termination of the serverless function 150-3 by sending an instruction to the response module 134 (see arrow 110). The instruction sent to the response module 134 includes the name of the serverless function 150-3 and any other information needed to identify the serverless function 150-3. Responsive to receiving the instruction from the controller module 131, the response module 134 running as a serverless function in the customer account 153-2 terminates the serverless function 150-3 by making a delete function API call.

FIG. 2 shows a flow diagram of a method 200 of controlling deployment of serverless function codes, in accordance with an embodiment of the present invention. The method 200 may be performed by the cybersecurity modules 130 to control deployment of serverless function codes. As can be appreciated, other components may also be employed without detracting from the merits of the present invention.

In step 201, a customer account of a plurality of customer accounts on a serverless platform is monitored for deployment of serverless function codes.

In step 202, a deployment monitoring module detects deployment of a serverless function code in the customer account on the serverless platform. Deployment of the serverless function code results in a corresponding serverless function running in the customer account. Deployment of the serverless function code may be detected from a log of event history of the customer account.

In step 203, responsive to detection of deployment of the serverless function code, a controller module checks a scan database to determine if cybersecurity analysis has been performed on the serverless function code.

In the step 204 to step 205, the serverless function code is copied from a first cloud storage bucket to a second cloud storage bucket of a cloud storage service when the serverless function code has not been subjected to cybersecurity analysis.

In step 206, cybersecurity analysis is performed on the serverless function code in the second cloud storage bucket to perform cybersecurity analysis on and generate a risk score of the serverless function code.

In step 207, the results of the cybersecurity analysis including the risk score are stored in the scan database.

In step 208, the risk score of the serverless function code is compared to a predetermined risk threshold.

In steps 209 and 210, when the risk score is less than the risk threshold, the controller module generates a log and performs no further action on the serverless function code. The log may simply indicate detection of deployment of the serverless function code, for example.

In steps 211 and 212, when the risk score is greater than the risk threshold, the controller module generates an alert and initiates termination of the corresponding serverless function in the customer account. The controller module may initiate termination of the serverless function by so informing a response module that is running in the customer account. The response module may terminate the serverless function by using an API for deleting a serverless function on the serverless platform.

In the method 200, the corresponding serverless function is terminated based on a comparison of the risk score to a risk threshold. As can be appreciated, termination of the corresponding serverless function or other response action may also be performed depending on applicable admission control policies as previously discussed.

Figure 3:
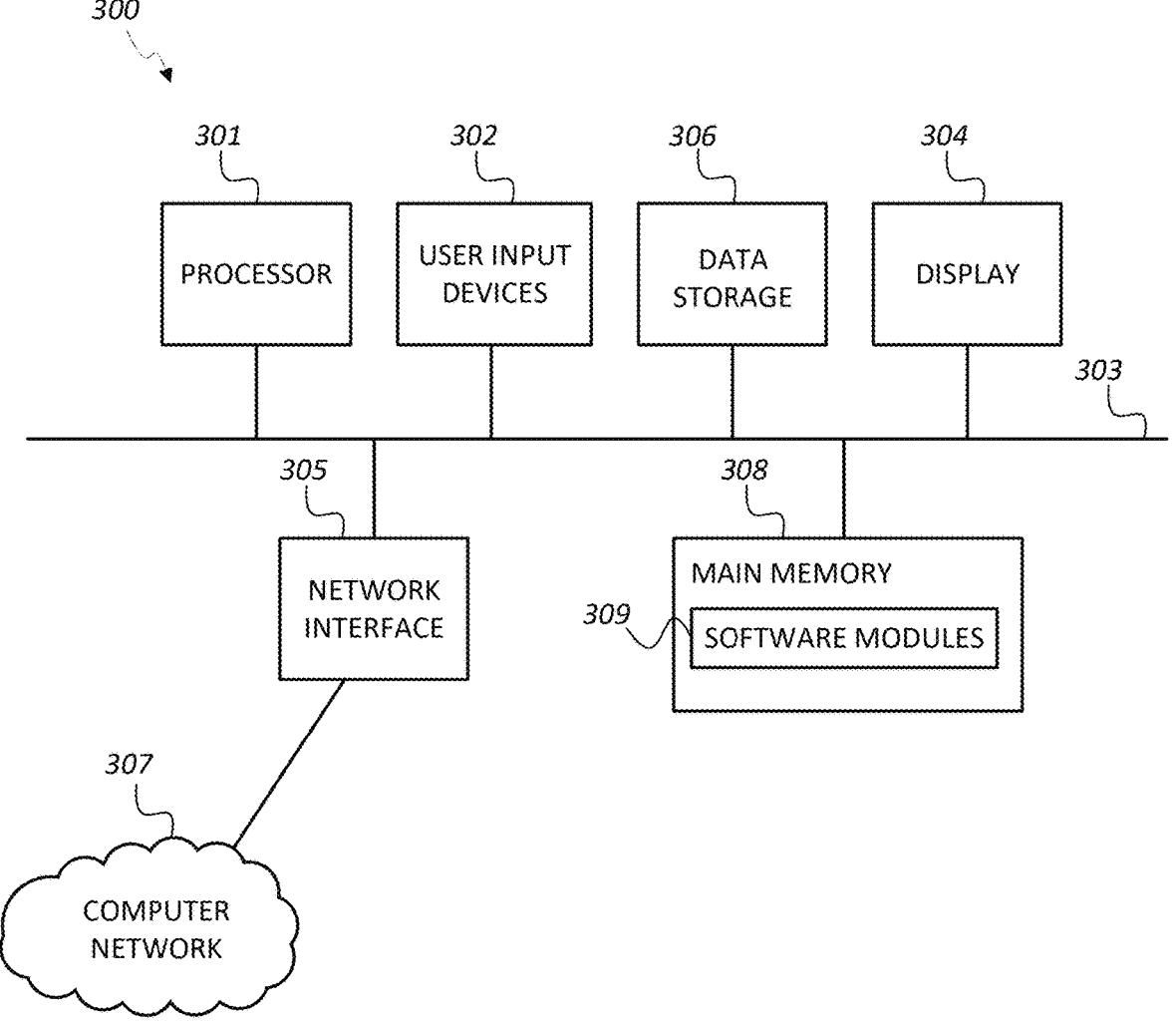
FIG. 3 shows a block diagram of a computer system that may be employed with embodiments of the present invention.

FIG. 3 shows a block diagram of a computer system 300 that may be employed with embodiments of the present invention. The computer system 300 may be employed as computing infrastructure of a cloud service provider, a dedicated computer system that hosts cybersecurity modules, or other computer system for hosting software modules of the present invention. The computer system 300 may have fewer or more components to meet the needs of a particular cybersecurity application. The computer system 300 may include one or more processors 301. The computer system 300 may have one or more buses 303 coupling its various components. The computer system 300 may include one or more user input devices 302 (e.g., keyboard, mouse), one or more data storage devices 306 (e.g., hard drive, optical disk, solid state drive), a display screen 304 (e.g., liquid crystal display, flat panel monitor), a computer network interface 305 (e.g., network adapter, modem), and a main memory 308 (e.g., random access memory). The computer network interface 305 may be coupled to a computer network 307, which in this example includes the public Internet.

The computer system 300 is a particular machine as programmed with one or more software modules 309, comprising instructions stored non-transitory in the main memory 308 for execution by at least one processor 301 to cause the computer system 300 to perform corresponding programmed steps. An article of manufacture may be embodied as computer-readable storage medium including instructions that when executed by at least one processor 301 cause the computer system 300 to be operable to perform the functions of the one or more software modules 309.

The software modules 309 may be cybersecurity modules in an embodiment where the computer system 300 is computing infrastructure of a service for controlling deployment of serverless function codes. The software modules 309 may comprise serverless function codes or runtime instances of serverless function codes (i.e., serverless functions) in an embodiment where the computer system 300 is computing infrastructure of a cloud service provider.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of controlling deployment of serverless function codes, the method comprising:

monitoring deployment of serverless function codes in a plurality of customer accounts of corresponding customers on a serverless platform of a cloud service provider, wherein the serverless platform dynamically manages allocation of computing resources of the serverless platform to run serverless functions in the plurality of customer accounts;

detecting deployment of a serverless function code of a customer in a first customer account of the plurality of customer accounts, the deployment of the serverless function code of the customer executes the serverless function code of the customer resulting in a corresponding serverless function of the customer to run in the first customer account;

responsive to detecting the deployment of the serverless function code of the customer in the first customer account, determining whether if any of a first set of admission control policies of the first customer account applies to the deployment of the serverless function code of the customer in the first customer account, wherein each customer account of the plurality of customer accounts has a separate set of admission control policies that apply to deployment of function codes in the customer account; and terminating the corresponding serverless function of the customer in the first customer account responsive to determining that the deployment of the serverless function code of the customer in the first customer account is prohibited by an admission control policy of the first set of admission control policies, wherein a user that deployed the serverless function code of the customer in the first customer account is a prohibited user, and the admission control policy indicates terminating a corresponding serverless function of a serverless function code deployed by a prohibited user.

2. The method of claim 1, wherein the serverless function code of the customer has malware, and the admission control policy indicates terminating a corresponding serverless function of a serverless function code that has malware.

3. The method of claim 1, wherein the serverless function code of the customer has a risk score that exceeds a risk threshold, and the admission control policy indicates terminating a corresponding serverless function of a serverless function code that has a risk score that exceeds the risk threshold.

4. The method of claim 1, wherein detecting the deployment of the serverless function code of the customer in the first customer account comprises:

parsing a log of event history of the first customer account for serverless function code deployments.

5. The method of claim 1, wherein terminating the corresponding serverless function of the customer comprises:

issuing a delete function application programming interface (API) call from another serverless function in the first customer account to delete the corresponding serverless function of the customer in the first customer account.

6. A system for controlling deployment of serverless function codes, the system comprising:

a serverless platform of a cloud service provider, the serverless platform comprising at least one processor and a memory, the memory of the serverless platform storing instructions that when executed by the at least one processor of the serverless platform cause the serverless platform to dynamically manage allocation of computing resources of the serverless platform to run serverless functions of a plurality of customers, each of the plurality of customers having a corresponding customer account of a plurality of customer accounts on the serverless platform; and a computer system that is separate from the serverless platform, the computer system comprising at least one processor and a memory, the memory of the computer system storing instructions that when executed by the at least one processor of the computer system cause the computer system to:

monitor deployment of serverless function codes of the plurality of customers on the serverless platform;

detect deployment of a serverless function code of a first customer of the plurality of customers in a first customer account of the plurality of customer accounts, the deployment of the serverless function code of the first customer executes the serverless function code of the first customer resulting in a corresponding serverless function of the first customer running in the first customer account;

responsive to detecting the deployment of the serverless function code of the first customer in the first customer account, determine whether any of a first set of admission control policies of the first customer account applies to the deployment of the serverless function code of the first customer in the first customer account, wherein each customer account of the plurality of customer accounts has a separate set of admission control policies that apply to deployment of function codes in the customer account; and initiate termination of the corresponding serverless function of the first customer in the first customer account responsive to determining that the deployment of the serverless function code of the first customer in the first customer account is prohibited by an admission control policy of the first set of admission control policies, wherein a user that deployed the serverless function code of the first customer in the first customer account is a prohibited user, and the admission control policy indicates terminating a corresponding serverless function of a serverless function code deployed by a prohibited user.

7. The system of claim 6, wherein the instructions stored in the memory of the computer system when executed by the at least one processor of the computer system cause the computer system to:

send an instruction to another serverless function in the first customer account to terminate the corresponding serverless function of the first customer in the first customer account.

8. The system of claim 6, wherein the instructions stored in the memory of the computer system when executed by the at least one processor of the computer system cause the computer system to detect the deployment of the serverless function code of the first customer in the first customer account by parsing a log of event history of the first customer account.

9. The system of claim 6, wherein the serverless function code has malware, and the admission control policy indicates terminating a corresponding serverless function of a serverless function code that has malware.

10. The system of claim 6, wherein the serverless function code has a risk score that exceeds a risk threshold, and the admission control policy indicates terminating a corresponding serverless function of a serverless function code that has a risk score that exceeds the risk threshold.

11. A method of controlling deployment of serverless function codes, the method comprising:

detecting deployment of a serverless function code of a customer in a customer account of a plurality of customer accounts on a serverless platform, the deployment of the serverless function code of the customer causes the serverless function code of the customer to execute resulting in a corresponding serverless function of the customer running in the customer account, the deployment of the serverless function code of the customer being detected from outside the customer account, wherein the serverless platform dynamically manages allocation of computing resources of the serverless platform to run serverless functions of a plurality of customers in corresponding customer accounts;

responsive to detecting the deployment of the serverless function code of the customer, determining whether the serverless function code of the customer has been subjected to cybersecurity analysis;

responsive to the serverless function code of the customer being determined as not having been subjected to cybersecurity analysis, copying the serverless function code of the customer from a first storage location to a second storage location;

after copying the serverless function code of the customer from the first storage location to the second storage location, performing cybersecurity analysis on the serverless function code of the customer to generate a risk score of the serverless function code of the customer; and terminating the corresponding serverless function of the customer in the customer account in response to the risk score indicating that the serverless function code of the customer poses a severe security risk, wherein terminating the corresponding serverless function of the customer in the customer account comprises issuing an application programming interface (API) call from another serverless function in the customer account to delete the corresponding serverless function of the customer.

12. The method of claim 11, wherein detecting the deployment of the serverless function code of the customer comprises:

parsing a log of event history of the customer account; and detecting the deployment of the serverless function code from a record of the log of event history.

13. The method of claim 11, wherein performing the cybersecurity analysis on the serverless function code of the customer includes scanning the serverless function code of the customer for presence of malware.

14. The method of claim 11, wherein performing the cybersecurity analysis on the serverless function code of the customer includes scanning the serverless function code of the customer for vulnerabilities.

15. The method of claim 11, wherein the first and second storage locations are storage buckets of a cloud storage service.

16. The method of claim 11, wherein determining whether the serverless function code of the customer has been subjected to cybersecurity analysis comprises:

consulting a scan database that contains records of results of cybersecurity analysis performed on serverless function codes that have been deployed in the customer account.

* * * * *